US010551855B2

(12) United States Patent
Hart et al.

(10) Patent No.: US 10,551,855 B2
(45) Date of Patent: Feb. 4, 2020

(54) REGULATOR WITH CONVERTIBLE TRIM ASSEMBLY

(71) Applicant: EMERSON PROCESS MANAGEMENT REGULATOR TECHNOLOGIES, INC., McKinney, TX (US)

(72) Inventors: Justin W. Hart, Melissa, TX (US); Ernesto Vasquez, Dallas, TX (US); Tony A. Durant, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 177 days.

(21) Appl. No.: 15/786,840

(22) Filed: Oct. 18, 2017

(65) Prior Publication Data
US 2019/0101941 A1    Apr. 4, 2019

Related U.S. Application Data

(60) Provisional application No. 62/566,103, filed on Sep. 29, 2017.

(51) Int. Cl.
*G05D 16/06* (2006.01)
*F16K 3/26* (2006.01)
(Continued)

(52) U.S. Cl.
CPC ......... *G05D 16/0655* (2013.01); *F16K 3/262* (2013.01); *F16K 3/265* (2013.01);
(Continued)

(58) Field of Classification Search
CPC ... G05D 16/0658; G05D 16/0641; F16K 7/12
(Continued)

(56) References Cited

U.S. PATENT DOCUMENTS

| 332,731 | A | * | 12/1885 | Miller | .................. | B67D 1/1405 |
| | | | | | | 239/445 |
| 1,938,943 | A | * | 12/1933 | Terry | .................. | G05D 16/0658 |
| | | | | | | 137/494 |

(Continued)

FOREIGN PATENT DOCUMENTS

CN        205745503 U      11/2016

OTHER PUBLICATIONS

International Search Report for PCT/US2018/051478 dated Dec. 11, 2018, 6 pgs.

(Continued)

*Primary Examiner* — Umashankar Venkatesan
(74) *Attorney, Agent, or Firm* — Marshall, Gerstein & Borun LLP

(57) ABSTRACT

A regulator includes a body, a first cage positioned in the body, a diaphragm positioned within the body, and a second cage operatively connected to the diaphragm. The body has an inlet, an outlet, and a passage formed between the inlet and the outlet and the first cage is positioned adjacent the passage. The second cage moves with the diaphragm and is positionable on a first side of the diaphragm, opposite the first cage, or on a second side of the diaphragm such that the second cage is positioned within the first cage and is movable relative to the first cage.

20 Claims, 4 Drawing Sheets

(51) Int. Cl.
*F16K 47/08* (2006.01)
*F16K 37/00* (2006.01)
*F16K 7/12* (2006.01)
*F16K 7/17* (2006.01)
*F16K 47/04* (2006.01)

(52) U.S. Cl.
CPC ............... *F16K 3/267* (2013.01); *F16K 7/12* (2013.01); *F16K 7/17* (2013.01); *F16K 37/0008* (2013.01); *F16K 47/04* (2013.01); *F16K 47/08* (2013.01); *G05D 16/0641* (2013.01); *G05D 16/0658* (2013.01); *Y10T 137/7756* (2015.04)

(58) Field of Classification Search
USPC ........................................ 137/484.6; 251/331
See application file for complete search history.

(56) References Cited

U.S. PATENT DOCUMENTS

| | | | | |
|---|---|---|---|---|
| 2,886,281 A | * | 5/1959 | Canalizo | F16K 7/10 137/625.28 |
| 2,916,255 A | * | 12/1959 | Koehler | F16K 31/365 251/331 |
| 3,430,654 A | * | 3/1969 | Mills | B65D 90/587 137/625.28 |
| 4,181,151 A | | 1/1980 | Ensign | |
| 5,964,446 A | | 10/1999 | Walton et al. | |
| 2004/0011412 A1 | * | 1/2004 | Wears | F16K 1/52 137/625.33 |
| 2005/0166976 A1 | | 8/2005 | Folk et al. | |
| 2013/0025723 A1 | | 1/2013 | Dutrop | |
| 2015/0108379 A1 | * | 4/2015 | Juhnke | F16K 3/34 251/127 |
| 2016/0223099 A1 | | 8/2016 | Freitas et al. | |

OTHER PUBLICATIONS

Written Opinion of PCT/US2018/051478 dated Dec. 11, 2018, 7 pgs.
Type EZR Installation Guide dated May 2002.
Type EZR Bulletin 71.2 dated Jul. 2017.
Type EZR Technical Manual dated Aug. 2015.
Type EZR Instructional Manual D102600X012 dated May 2017.

* cited by examiner

REGULATOR WITH CONVERTIBLE TRIM ASSEMBLY

CROSS-REFERENCE TO RELATED APPLICATIONS

This application claims priority to U.S. Provisional Patent Application No. 62/566,103, entitled "Regulator with Convertible Trim Assembly" and filed Sep. 29, 2017, the entire disclosure of which is hereby incorporated by reference herein.

FIELD OF THE DISCLOSURE

This disclosure relates generally to regulators and, more particularly, to trim assemblies for regulators.

BACKGROUND

Often times fluid regulators, especially "boot style" regulators where the diaphragm ("boot") acts as both the actuator/sensing member and as the sealing member, can exhibit instability at low fluid flow conditions. Because the diaphragm is used to engage and seal and move away from a sealing surface (e.g., of a cage) to prevent/allow the flow of fluid, during low flow conditions the travel is so small that any minor fluctuation in the fluid flow results in the regulator shutting off and then overcorrecting by opening too much. The regulator then cycles between closing and opening and often times the frequency of these fluctuations can be fractions of a second.

Attempts to reduce instability in these regulators usually involve using stiffer springs, lower gain, smaller control lines, or adding friction. However, these attempts have had limited success in reducing instability and often require several return trips, trial and error, and parts kits.

BRIEF SUMMARY OF THE DISCLOSURE

In accordance with one exemplary aspect of the present invention, a regulator comprises a body having an inlet, an outlet, and a passage formed between the inlet and the outlet and a first cage positioned in the body adjacent the passage and between the inlet and the outlet. A diaphragm is positioned within the body and a second cage is operatively connected to the diaphragm such that the second cage moves with the diaphragm. The second cage is positionable on a first side of the diaphragm, opposite the first cage, or on a second side of the diaphragm such that the second cage is positioned within the first cage and is movable relative to the first cage.

In further accordance with any one or more of the foregoing exemplary aspects of the present invention, a regulator may further include, in any combination, any one or more of the following preferred forms.

In one preferred form, the second cage has a plurality of second openings formed radially through a cylindrical wall of the second cage.

In another preferred form, the plurality of second openings are offset from an end of the second cage by a predetermined distance such that the diaphragm is required to travel the predetermined distance away from the first cage to allow the flow of fluid through the second openings of the second cage.

In another preferred form, the diaphragm is movable between a closed position, in which the diaphragm engages the first cage to prevent the flow of fluid through the first cage, and an open position, in which the diaphragm is spaced apart from the first cage to allow the flow of fluid through the first cage.

In another preferred form, the first cage defines a seating surface and the diaphragm engages or moves away from the seating surface to control a flow of fluid through the first cage.

In another preferred form, the first cage has an outwardly extending flange and a plurality of first openings formed through the flange.

In another preferred form, the flange of the first cage defines a seating surface and the diaphragm engages the seating surface of the first cage in the closed position to prevent the flow of fluid through the plurality of first openings.

In accordance with another exemplary aspect of the present invention, a trim assembly includes a first cage and a second cage positioned within the first cage and movable relative to the first cage. The first cage has an outwardly extending flange and a plurality of first openings formed through the flange. The second cage has a plurality of second openings formed radially through a cylindrical wall of the second cage.

In further accordance with any one or more of the foregoing exemplary aspects of the present invention, a trim assembly may further include, in any combination, any one or more of the following preferred forms.

In one preferred form, the flange of the first cage defines a seating surface configured to engage a diaphragm to control a flow of fluid through the plurality of first openings.

In another preferred form, the second cage is operatively connected to and moves with the diaphragm.

In another preferred form, the plurality of second openings are offset from an end of the second cage by a predetermined distance such that the diaphragm is required to travel the predetermined distance away from the seating surface of the flange of the first cage to allow the flow of fluid through the second openings of the second cage.

In another preferred form, a regulator includes the trim assembly and the regulator comprises a body having an inlet, an outlet, and a passage formed between the inlet and the outlet and a diaphragm positioned within the body. The first cage is positioned within the body adjacent the passage and between the inlet and the outlet. The diaphragm is movable between a closed position, in which the diaphragm engages the first cage to prevent the flow of fluid through the plurality of first openings, and an open position, in which the diaphragm is spaced apart from the first cage to allow the flow of fluid through the plurality of first openings. The second cage is operatively connected to the diaphragm such that the second cage moves with the diaphragm.

In another preferred form, the flange of the first cage defines a seating surface and the diaphragm engages the seating surface of the first cage in the closed position.

In another preferred form, the plurality of second openings are offset from an end of the second cage by a predetermined distance such that the diaphragm is required to travel the predetermined distance away from the first cage to allow the flow of fluid through the second openings of the second cage.

In accordance with another exemplary aspect of the present invention, a method of configuring a regulator, comprising the steps of: positioning a first cage in a body of the regulator between an inlet and an outlet of the regulator; operatively connecting a second cage to a diaphragm of the regulator; positioning the diaphragm in the body of the regulator such that the second cage is positioned within the first cage and is movable within the first cage when the regulator is being used in a low flow application; and positioning the diaphragm in the body of the regulator such that the second cage is positioned spaced apart from the first cage and on an opposite side of the diaphragm from the first cage when the regulator is being used in a high flow application.

In further accordance with any one or more of the foregoing exemplary aspects of the present invention, a method of configuring a regulator may further include, in any combination, any one or more of the following preferred forms.

In one preferred form, the second cage has a plurality of second openings formed radially through a cylindrical wall of the second cage.

In another preferred form, the plurality of second openings are offset from an end of the second cage by a predetermined distance such that the diaphragm is required to travel the predetermined distance away from the first cage to allow the flow of fluid through the second openings of the second cage.

In another preferred form, the diaphragm is movable between a closed position, in which the diaphragm engages the first cage to prevent the flow of fluid through the first cage, and an open position, in which the diaphragm is spaced apart from the first cage to allow the flow of fluid through the first cage.

In another preferred form, the first cage has an outwardly extending flange and a plurality of first openings formed through the flange.

In another preferred form, the flange defines a seating surface and the diaphragm engages the seating surface in the closed position to prevent the flow of fluid through the plurality of first openings.

DETAILED DESCRIPTION

The present invention addresses the problem of instability at low flows inherent in current regulators, especially "boot style" regulators discussed above, by providing convertible nested cages. For low flow applications, a second cage (e.g., a cylindrical drilled hole cage) is nested within a first cage (e.g., a slotted cage), which improves the stability of the regulator by requiring the sealing member to travel further from the valve seat before fluid flow is allowed through the regulator and to achieve the desired flow rate, as described in more detail below. Therefore, minor fluctuations in the fluid flow that may move the sealing member will not cycle the regulator by shutting off the fluid flow and overcorrect by opening the fluid flow too far.

The second cage can also be used to reduce noise as fluid flows through the regulator and is convertible so that the same regulator can be used for both low flow and high flow applications. For example, the second cage can be positioned to control the travel of the sealing member when used in a low flow application, as discussed above, or the can be positioned away from the first cage to convert the regulator to be used in a high flow application. For example, a regulator can be installed and configured for high flow during winter months, when fluid demand is high, and be converted for low flow during summer months, when fluid demand is lessened. In addition, when a regulator is installed, the likelihood of a system to be more or less stable is unknown. In this instance, the regulator can be configured for low or high flow situations on site during the installation.

Figure 1:
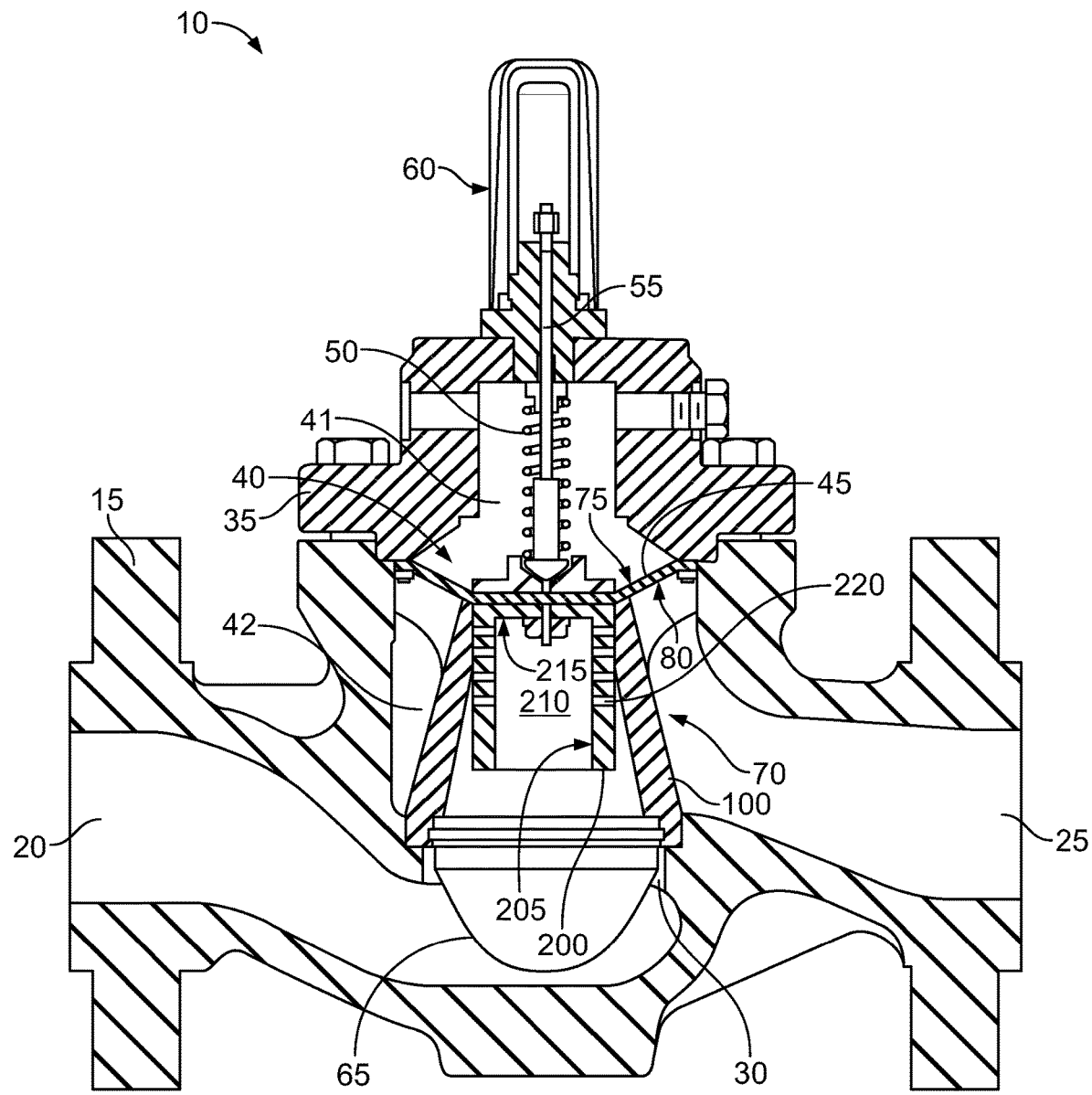
FIG. 1 is a cross-sectional view of an example regulator in a closed position, with the trim assembly in a first configuration.
Figure 2:
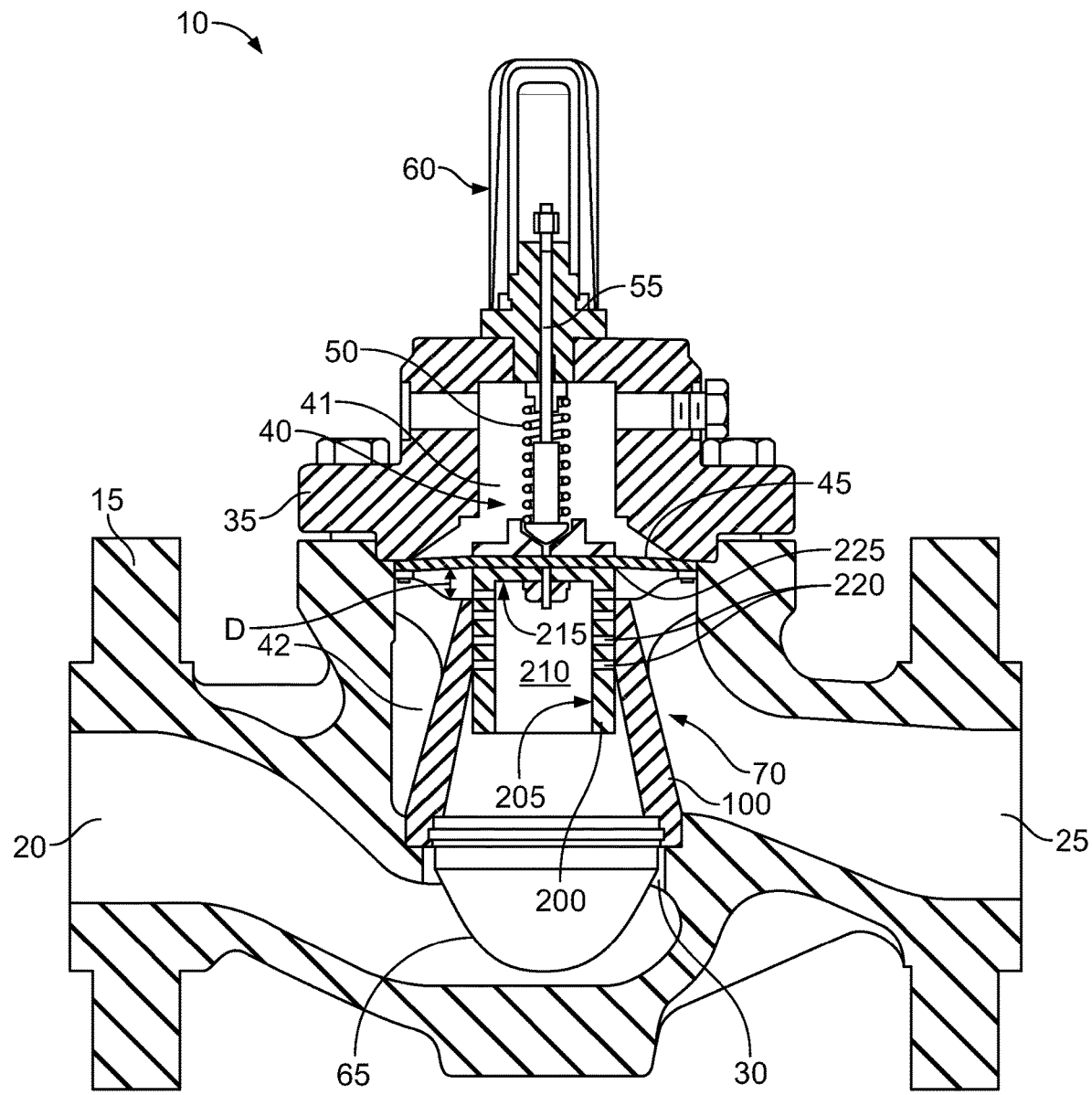
FIG. 2 is a cross-sectional view of the regulator of FIG. 1 in an open position.
Figure 3:
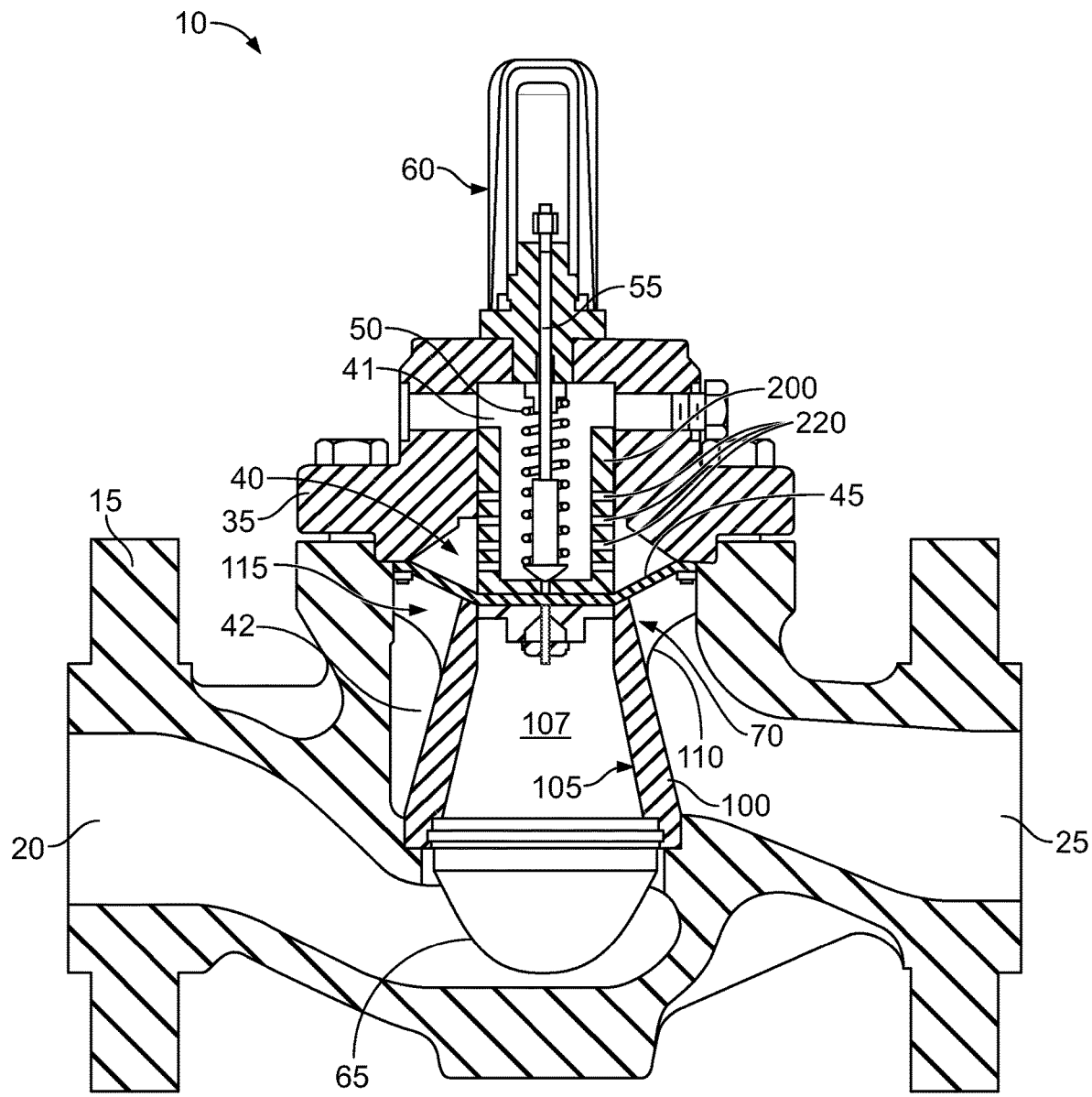
FIG. 3 is a cross-sectional view of the regulator of FIG. 1 in the closed position, with the trim assembly in a second configuration.

Referring to FIGS. 1-3, a regulator 10 is shown that is convertible for either low flow applications (FIGS. 1 and 2) or for high flow applications (FIG. 3). Regulator 10 generally includes a body 15 having an inlet 20, an outlet 25, and a passageway 30 formed between the inlet 20 and outlet 25. A bonnet 35 is attached to body 15 to form cavity 40 and diaphragm 45 is disposed in cavity 40 to divide cavity 40 into an upper cavity 41 and a lower cavity 42. A trim assembly 70, having first cage 100 and second cage 200, is disposed within body 15 and interacts with diaphragm 45 to control the flow of fluid through regulator 10. A biasing member 50, such as a spring, biases diaphragm 45 into a closed position, where diaphragm 45 engages first cage 100. A filter 65, or other type of screen, can also be positioned adjacent and upstream of passageway 30 to prevent debris from passing through regulator 10.

Diaphragm 45 is positioned within body 15 and is movable between a closed position (FIGS. 1 and 3), in which diaphragm 45 engages first cage 100 to prevent the flow of fluid through first cage 100, and an open position (FIG. 2), in which diaphragm 45 is spaced apart from first cage 100 to allow the flow of fluid through first cage 100. Diaphragm 45 can also be operatively coupled to a stem 55, which is connected to a travel indicator 60 to provide a visual indication of the position of diaphragm 45.

Figure 4:
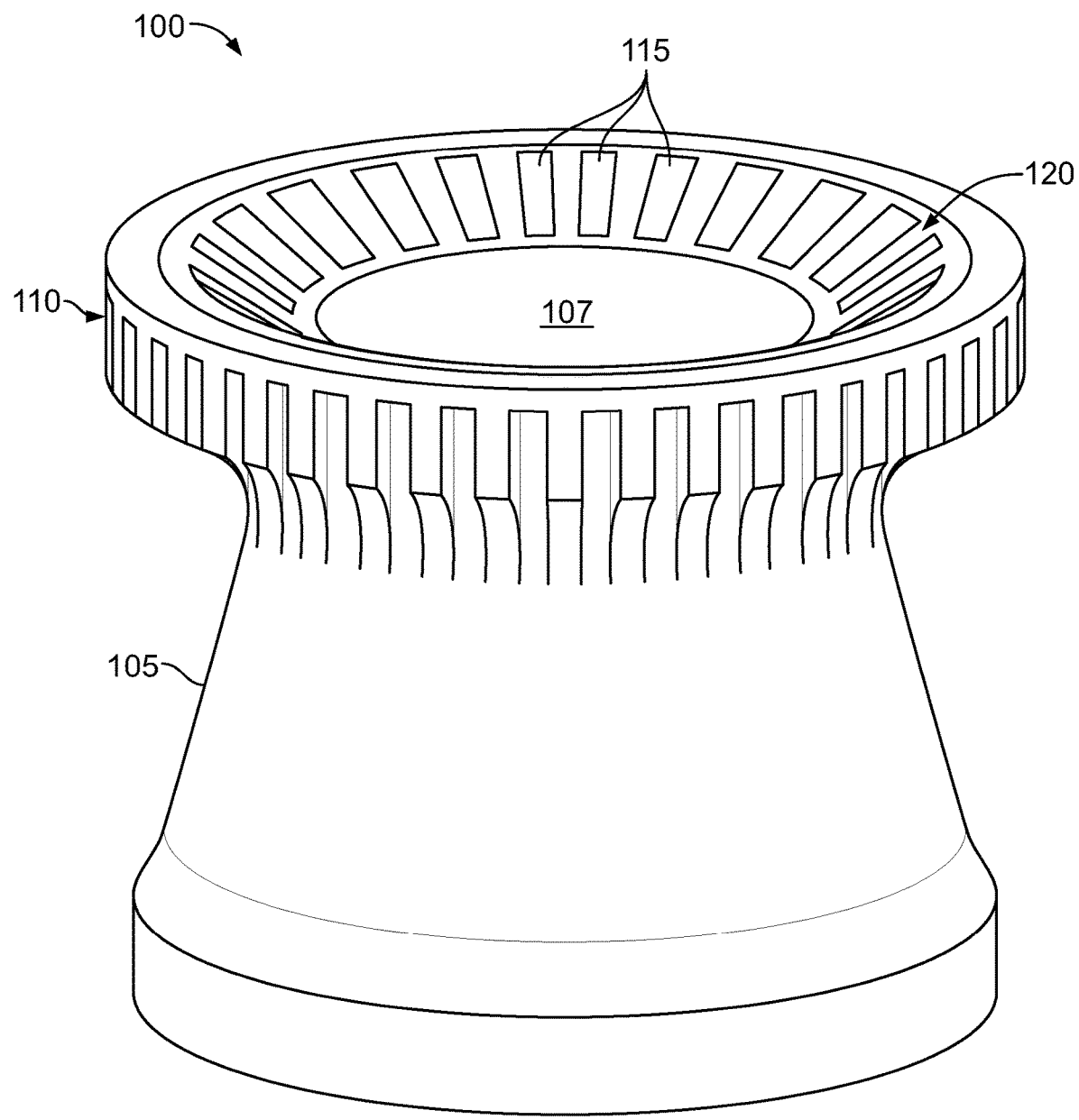
FIG. 4 is a perspective view of an example valve cage of the regulator of FIG. 1.

First cage 100 is positioned in body 15 adjacent passageway 30 and between inlet 20 and outlet 25. As can best be seen in FIG. 4, first cage 100 has a generally conical body 105 forming a hollow central bore 107 and an outwardly extending flange 110 that extends from an outer surface of conical body 105. Openings 115, or slots, are formed through flange 110 to allow the flow of fluid from inlet 20 to outlet 25 when diaphragm 45 is in the open position. A surface of flange 110 of first cage 100 defines a seating surface 120 and diaphragm 45 engages or moves away from seating surface 120 to control the flow of fluid through openings 115 of first cage 100. In the closed position, diaphragm 45 engages seating surface 120 to prevent the flow of fluid through openings 115 and, in the open position, diaphragm 45 is spaced apart from seating surface 120 to allow the flow of fluid through openings 115.

Second cage 200 has a generally cylindrical side wall 205 forming a hollow central bore 210 and a generally planar end wall 215 at one end of side wall 205. Openings 220 are formed generally radially through side wall 205 of second cage 200 to allow the flow of fluid through second cage 200. Second cage 200 is operatively connected to diaphragm 45, such that second cage 200 moves with diaphragm 45.

When configured for high flow applications (FIG. 3), second cage 200 is positionable on a first side 75 of diaphragm 45, opposite first cage 100, and extends into upper cavity 41 and bonnet 35. In this configuration, second cage 200 does not have an effect on the flow of fluid through regulator 10 and is generally not required since stability issues are usually not present in high flow applications.

Regulator 10 is also convertible for use in low flow applications. When configured for low flow applications (FIGS. 1 and 2), second cage 200 is positionable on a second side 80 of diaphragm 45 so that second cage 200 extends into lower cavity 42 and is positioned within and movable relative to first cage 100. Openings 220 in second cage 200 are offset from and end 225 of second cage 200 by a predetermined distance D. Offsetting openings 220 from end 225 of second cage 200 makes diaphragm 45 travel distance D away from seating surface 120 of flange 110 of first cage 100 before fluid is allowed to flow through openings 220 and reach openings 115 in first cage 100. Therefore, fluid flow is not allowed through regulator 10 from inlet 20 to outlet 25 until diaphragm 45 has moved a sufficient distance from first cage 100, which increases the stability of regulator 10 since minor fluctuations in fluid flow during low flow applications will not cause diaphragm 45 to continually open and close against first cage 100 due to the low fluid flow.

Because second cage 200 is positionable on either side of diaphragm 45, regulator 10 can be configured by positioning first cage 100 in body 15 of regulator 10 between inlet 20 and outlet 25 and operatively connecting second cage 200 to diaphragm 45 in various positions depending on the intended application, as discussed above. If regulator 10 is to be used in a high flow application or over time it is determined that low flow is not an issue in a particular system, diaphragm 45 can be installed or converted and positioned in body 15 such that second cage 200 is positioned spaced apart from first cage 100 and on an opposite side of diaphragm 45 from first cage 100 (FIG. 3). Conversely, as discussed above, if regulator 10 is to be used in a low flow application or it is determined that the flow through regulator 10 is causing instability, diaphragm 45 can be installed or converted and positioned in body 15 such that second cage 200 is positioned within first cage 100 and is movable within first cage 100 (FIGS. 1 and 2), which will required diaphragm 45 to travel further away from first cage 100 before fluid flow is allowed to increase the stability of regulator 10.

While various embodiments have been described above, this disclosure is not intended to be limited thereto. Variations can be made to the disclosed embodiments that are still within the scope of the appended claims.

What is claimed is:

1. A regulator, comprising:
a body having an inlet, an outlet, and a passage formed between the inlet and the outlet;
a first cage positioned in the body adjacent the passage and between the inlet and the outlet;
a diaphragm positioned within the body; and
a second cage operatively connected to the diaphragm such that the second cage moves with the diaphragm; wherein
the second cage is positionable on a first side of the diaphragm, opposite the first cage, or on a second side of the diaphragm such that the second cage is positioned within the first cage and is movable relative to the first cage.

2. The regulator of claim 1, wherein the second cage has a plurality of second openings formed radially through a cylindrical wall of the second cage.

3. The regulator of claim 2, wherein the plurality of second openings are offset from an end of the second cage by a predetermined distance such that the diaphragm is required to travel the predetermined distance away from the first cage to allow a flow of fluid through the second openings of the second cage.

4. The regulator of claim 1, wherein the diaphragm is movable between a closed position, in which the diaphragm engages the first cage to prevent a flow of fluid through the first cage, and an open position, in which the diaphragm is spaced apart from the first cage to allow the flow of fluid through the first cage.

5. The regulator of claim 4, wherein the first cage defines a seating surface and the diaphragm engages or moves away from the seating surface to control a flow of fluid through the first cage.

6. The regulator of claim 4, wherein the first cage has an outwardly extending flange and a plurality of first openings formed through the flange.

7. The regulator of claim 6, wherein the flange of the first cage defines a seating surface and the diaphragm engages the seating surface of the first cage in the closed position to prevent the flow of fluid through the plurality of first openings.

8. A trim assembly, comprising:
a first cage having an outwardly extending flange and a plurality of first openings formed through the flange; and
a second cage having a plurality of second openings formed radially through a cylindrical wall of the second cage; wherein
the second cage is operatively connected to a diaphragm and is positionable on a first side of the diaphragm, opposite the first cage, for high flow applications and on a second side of the diaphragm such that the second cage is positioned within the first cage and is movable relative to the first cage for low flow applications.

9. The trim assembly of claim 8, wherein the flange of the first cage defines a seating surface configured to engage the diaphragm to control a flow of fluid through the plurality of first openings.

10. The trim assembly of claim 9, wherein the second cage moves with the diaphragm.

11. The trim assembly of claim 10, wherein the plurality of second openings are offset from an end of the second cage by a predetermined distance such that the diaphragm is required to travel the predetermined distance away from the seating surface of the flange of the first cage to allow the flow of fluid through the second openings of the second cage.

12. A regulator comprising the trim assembly of claim 8, the regulator comprising:
a body having an inlet, an outlet, and a passage formed between the inlet and the outlet; wherein
the diaphragm is positioned within the body;
the first cage is positioned within the body adjacent the passage and between the inlet and the outlet;
the diaphragm is movable between a closed position, in which the diaphragm engages the first cage to prevent a flow of fluid through the plurality of first openings, and an open position, in which the diaphragm is spaced apart from the first cage to allow the flow of fluid through the plurality of first openings; and
the second cage moves with the diaphragm.

13. The regulator of claim 12, wherein the flange of the first cage defines a seating surface and the diaphragm engages the seating surface of the first cage in the closed position.

14. The regulator of claim 12, wherein the plurality of second openings are offset from an end of the second cage by a predetermined distance such that the diaphragm is required to travel the predetermined distance away from the first cage to allow the flow of fluid through the second openings of the second cage.

15. A method of configuring a regulator, comprising the steps of:
   positioning a first cage in a body of the regulator between an inlet and an outlet of the regulator;
   operatively connecting a second cage to a diaphragm of the regulator;
   positioning the diaphragm in the body of the regulator such that the second cage is positioned within the first cage and is movable within the first cage when the regulator is being used in a low flow application; and
   positioning the diaphragm in the body of the regulator such that the second cage is positioned spaced apart from the first cage and on an opposite side of the diaphragm from the first cage when the regulator is being used in a high flow application.

16. The method of claim 15, wherein the second cage has a plurality of second openings formed radially through a cylindrical wall of the second cage.

17. The method of claim 16, wherein the plurality of second openings are offset from an end of the second cage by a predetermined distance such that the diaphragm is required to travel the predetermined distance away from the first cage to allow a flow of fluid through the second openings of the second cage.

18. The method of claim 15, wherein the diaphragm is movable between a closed position, in which the diaphragm engages the first cage to prevent a flow of fluid through the first cage, and an open position, in which the diaphragm is spaced apart from the first cage to allow the flow of fluid through the first cage.

19. The method of claim 18, wherein the first cage has an outwardly extending flange and a plurality of first openings formed through the flange.

20. The method of claim 19, wherein the flange defines a seating surface and the diaphragm engages the seating surface in the closed position to prevent the flow of fluid through the plurality of first openings.

* * * * *